(12) United States Patent
Okamoto et al.

(10) Patent No.: US 10,774,265 B2
(45) Date of Patent: Sep. 15, 2020

(54) ARTIFICIAL SUEDED LEATHER BEING EXCELLENT IN FLAME RETARDANCE AND METHOD OF PRODUCING THE SAME

(75) Inventors: Keiji Okamoto, Konan (JP); Katsuo Sasa, Yawata (JP); Kazumi Ueno, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/988,484

(22) PCT Filed: Jul. 7, 2006

(86) PCT No.: PCT/JP2006/313552
§ 371 (c)(1),
(2), (4) Date: Jan. 8, 2008

(87) PCT Pub. No.: WO2007/007660
PCT Pub. Date: Jan. 18, 2007

(65) Prior Publication Data
US 2009/0258182 A1  Oct. 15, 2009

(30) Foreign Application Priority Data

Jul. 8, 2005 (JP) ................................. 2005-200481

(51) Int. Cl.
| | | |
|---|---|---|
| D06N 3/14 | (2006.01) | |
| D06M 13/292 | (2006.01) | |
| D06M 15/333 | (2006.01) | |
| D06M 15/564 | (2006.01) | |
| D06M 15/579 | (2006.01) | |
| C09K 21/12 | (2006.01) | |
| D06N 3/00 | (2006.01) | |
| D06N 3/04 | (2006.01) | |
| C09K 21/04 | (2006.01) | |
| D06M 15/53 | (2006.01) | |

(52) U.S. Cl.
CPC .............. *C09K 21/12* (2013.01); *C09K 21/04* (2013.01); *D06M 13/292* (2013.01); *D06M 15/333* (2013.01); *D06M 15/53* (2013.01); *D06M 15/564* (2013.01); *D06N 3/0056* (2013.01); *D06N 3/0059* (2013.01); *D06N 3/04* (2013.01); *D06M 2200/30* (2013.01); *Y10T 428/2395* (2015.04); *Y10T 442/268* (2015.04)

(58) Field of Classification Search
CPC ..................................... C08K 9/10; C08K 9/06
USPC ........................................................ 442/136
See application file for complete search history.

(56) References Cited

U.S. PATENT DOCUMENTS

| 5,916,636 | A | * | 6/1999 | Vogt | ........................... 427/389.9 |
| 6,172,035 | B1 | * | 1/2001 | Hohn-Stocker | .......... A61K 8/45 |
| | | | | | 510/119 |
| 6,312,810 | B1 | * | 11/2001 | Nozaki et al. | ............. 428/411.1 |
| 2003/0022575 | A1 | * | 1/2003 | Yoneda et al. | ................. 442/104 |
| 2003/0232555 | A1 | * | 12/2003 | Nobuto et al. | ................. 442/136 |
| 2004/0029470 | A1 | * | 2/2004 | Vogt et al. | ...................... 442/104 |
| 2004/0253370 | A1 | * | 12/2004 | Hoersch | ........................ 427/175 |
| 2005/0106967 | A1 | * | 5/2005 | Suzuki | .................... B32B 27/12 |
| | | | | | 442/86 |
| 2005/0277711 | A1 | * | 12/2005 | Takahata | .................. C08K 9/06 |
| | | | | | 523/210 |

FOREIGN PATENT DOCUMENTS

| JP | 58-13786 A | 1/1983 |
| JP | 60-215878 A | 10/1985 |
| JP | 5-272069 A | 10/1993 |
| JP | 7-18584 A | 1/1995 |

(Continued)

OTHER PUBLICATIONS

U. Krastner; Colloids and Surfaces A; Physicochemical and Engineering Aspects vol. 183-185, Jul. 15, 2001, pp. 805-821.*
ACRYSOL ASE 60, DOW, Technical data Sheet for; Aug. 2003.*
TAFIGEL 10 AP, Munzing Chemie, Technical Data Sheet; Nov. 2011.*
Water solubility of Ammonium Polyphosphate: http://polymer-additives.specialchem.com/centers/ammonium-polyphosphate/water-solubility in support of this position. Oct. 2014.*

(Continued)

*Primary Examiner* — Jennifer A Chriss
*Assistant Examiner* — Ricardo E Lopez
(74) *Attorney, Agent, or Firm* — DLA Piper LLP (US)

(57) ABSTRACT

It is intended to provide a novel artificial sueded leather having flame retardance, which is excellent inflame retardance, light resistance and abrasion resistance, suffers from no water spot and is free from any halogenated chemical (i.e., one having been treated with a so-called non-halogenated flame retardant), and a method of producing the same. The above artificial sueded leather comprises a thermoplastic synthetic fiber cloth made of a woven fabric, a knitted web or a nonwoven fabric, which has a raised-fiber or napped-fiber surface and has been impregnated with a polyurethane resin, and a flame retardant which contains at least a phosphate compound A having a solubility in water of 1% or less, a vinyl group-containing resin C capable of forming a carbonization skeleton in burning and a water-insoluble thickener D and is imparted to one face of the thermoplastic synthetic fiber cloth. A method of producing the artificial sueded leather as described above comprises imparting an flame retardant, which contains at least a phosphate compound A having a solubility in water of 1% or less, a vinyl group-containing resin C capable of forming a carbonization skeleton in burning and a water-insoluble thickener D, to one face of a thermoplastic synthetic fiber cloth made of a woven fabric, a knitted web or a nonwoven fabric which has a raised-fiber or napped-fiber surface and has been impregnated with a polyurethane resin.

2 Claims, No Drawings

(56) References Cited

FOREIGN PATENT DOCUMENTS

| | | | |
|---|---|---|---|
| JP | 2002-294571 A | | 10/2002 |
| JP | 2003-147688 A | | 5/2003 |
| JP | 2004-36011 A | | 2/2004 |
| JP | 2004-107840 A | | 4/2004 |
| JP | 2004-308051 A | | 11/2004 |
| JP | 2005-2512 A | | 1/2005 |
| JP | 2005187975 A | * | 7/2005 |

OTHER PUBLICATIONS

Machine Translation of JP-2005-187975A, Apr. 2015.*
Exolite AP 462, TDS Apr. 2015.*
Defining the Condensed Phosphates; Markowitz M.M. NY University.*
Definition of emulsion-chemistry by The Editors of Encyclopaedia Britannica (Year: 2019).*

* cited by examiner

ARTIFICIAL SUEDED LEATHER BEING EXCELLENT IN FLAME RETARDANCE AND METHOD OF PRODUCING THE SAME

RELATED APPLICATION

This is a § 371 of International Application No. PCT/JP2006/313552, with an international filing date of Jul. 7, 2006 (WO 2007/007660 A1, published Jan. 18, 2007), which is based on Japanese Patent Application No. 2005-200481, filed Jul. 8, 2005.

TECHNICAL FIELD

The present invention relates to an artificial sueded leather being excellent in flame retardance and a method of producing the same.

More particularly, the present invention relates to an artificial sueded leather and a method for producing the same, the artificial leather comprising as a base a thermoplastic synthetic fiber cloth made of a woven fabric, a knitted web, or a nonwoven fabric whose fibers are raised or napped at the surface, and which has been impregnated with a polyurethane resin. The artificial leather has excellent flame retardance without using halogenated flame retardant substances, exhibits no water spot, is soft, and is excellent in both texture and flame retardance.

The water spot herein refers to the phenomenon in artificial sueded leathers to which a flame retardant compound has been imparted, wherein water or water droplets such as rain adhere to the outer surface of the leather, and upon drying, those portions that were wet become white spots or stains.

BACKGROUND ART

Conventionally, artificial sueded leathers have been widely developed as a luxury apparel material. These artificial sueded leathers comprise a nonwoven fabric, woven fabric, or knitted web made of ultra-fine thermoplastic synthetic fibers into which an elastomer such as polyurethane is impregnated, and whose surface is formed by buffing to raise the thermoplastic synthetic fibers thereof.

In recent years, these artificial raised-fiber sueded leathers have been developed not only for applications in apparel, but also for applications as industrial materials, such as for automotive upholstery (e.g., for the seats and interiors of luxury cars), wheelchair upholstery, furniture/interior applications such as wall materials, and for construction.

In these non-apparel fields of application, there have been demands in particular for a material having extremely high flame retardant properties.

For this reason, a variety of investigations were conducted with an aim to overcome the below problems (a) through (d) that are particular to artificial sueded leathers and not to typical woven/knitted materials made of synthetic fibers, in order to realize flame retardant properties exceeding the flame retardance at the level of the conventional art.

(a) There are gaps in the inter-fiber portions of the standing fibers, and structurally, the material is easily flammable.
(b) The flame retardant mechanisms for the elastomer and the thermoplastic synthetic fibers are different.
(c) The flame retardant reduces the appearance, the surface quality, and the light resistance of the artificial sueded leather.
(d) The flame retardance process leads to a lowering of the color fastness of the dye and texture hardening.

A method for solving the above-described problems (a) through (d) has been proposed wherein a halogenated phosphate ester is applied along with an acrylic acid ester resin to the reverse face of the raised-fiber surface (Patent Literature 1).

In addition, a method has been proposed wherein flame retardant is included in advance in the elastomer of polyurethane or other material that is impregnated in a nonwoven or other fabric (Patent Literature 2).

In addition, a method has been proposed that uses thermoplastic synthetic fibers whose organic phosphorus components have been copolymerized (Patent Literature 3).

However, although the method of Patent Literature 1, wherein a halogenated phosphate ester is applied along with an acrylic acid ester resin to the reverse face of the raised-fiber surface, is excellent in flame retardance, there are problems in that, due to the halogen, poisonous halogen gas, dioxins, and halogen compounds generated during burning accumulate inside living organisms.

In addition, in the method of Patent Literature 2, wherein flame retardant is included in advance in the polyurethane that is impregnated in a nonwoven fabric, there are problems in that the degree of polymerization of the polyurethane decreases over time. Since the polyurethane or other elastomer can become brittle, long use can lead to deterioration in the strength of the artificial raised-fiber sueded leather, which can then lead to not only tearing, wear from friction, fluffs and residual strain, but also lower the color fastness to light of the dye.

In addition, in the method of Patent Literature 3, wherein thermoplastic synthetic fibers whose organic phosphorus components have been copolymerized are used, there is not only the problem of the increased production costs that accompany the investment into polymerization equipment and switching product stock, but also the inevitable problems of the insufficient strength characteristics particular to copolymerized fibers, and the insufficient color fastness to light.

In addition, a sueded fiber structure has been proposed wherein a resin composition, which includes an acrylic acid ester resin as the primary component as well as an aromatic phosphate ester compound and a metallic oxide, is applied to the surface of the thermoplastic synthetic fiber fabric that has a raised-fiber portion at the surface thereof. This sueded fiber structure has been proposed as having excellent fire prevention properties including self-extinguishing properties, and additionally, has excellent texture and no lowering of color fastness; moreover, poisonous gases such as dioxins are not readily generated during incineration (Patent Literature 4).

In addition, a sueded fiber structure having a raised-fiber portion on the outer surface thereof has been proposed wherein an acrylic acid ester resin and an organic fluorinated polymer-type water repellant are imparted to the sueded fiber structure. Additionally, an acrylic acid ester resin composition, which includes an aromatic phosphate ester compound and a metallic oxide, is imparted to the inner surface of the sueded fiber structure. This sueded fiber structure has been proposed as having excellent fire prevention properties and melt resistance; in other words, the fiber structure has excellent fire prevention properties and melt resistance including self-extinguishing properties, and additionally, has excellent texture and no lowering of color fastness. Moreover, poisonous gases such as dioxins are not readily generated during incineration (Patent Literature 5).

In addition, an artificial leather has been proposed wherein a flame retardant composition is imparted to one face of a fabric, the flame retardant composition including a binder resin, at least one phosphate compound selected from the group consisting of guanidine phosphate, ammonium polyphosphate, melamine polyphosphate, and phosphoramides, as well as at least one compound selected from the group consisting of pentaerythritol, dipentaerythritol, melamine, dicyandiamide, starches, celluloses, and sorbitol, and the fabric being a woven fabric, a knitted web, or a nonwoven fabric including synthetic fibers having a single-fiber fineness of not more than 1 decitex and including an elastomer. This flame-retardant raised-fiber artificial leather has been proposed as having excellent flame retardance, light resistance, and wear resistance, as well as being non-halogenated (Patent Literature 6).

However, in the related art regarding flame retardance in Patent Literature 4 and 5, automobile seats melted while burning during a FMVSS No. 302 test of horizontal burning speed, a flammability testing method. For this reason, adapting the related art to pass this test has been difficult.

In addition, although that which is described in Patent Literature 6 has acceptable flame retardance, this related art still has problems regarding water spot.

Patent Literature 1: Japanese Unexamined Patent Application Publication No. S58-013786
Patent Literature 2: Japanese Unexamined Patent Application Publication No. H7-18584
Patent Literature 3: Japanese Unexamined Patent Application Publication No. 2002-294571
Patent Literature 4: Japanese Unexamined Patent Application Publication No. 2004-36011
Patent Literature 5: Japanese Unexamined Patent Application Publication No. 2004-308051
Patent Literature 6: Japanese Unexamined Patent Application Publication No. 2005-2512

DISCLOSURE OF THE INVENTION

It is an object of the present invention, being devised in the light of related art such as the above, to provide a novel flame-resistant artificial sueded leather, and a method for production thereof, that is excellent in flame retardance, light resistance, and abrasion resistance, and furthermore does not exhibit water spot nor uses any halogenated chemical (i.e., is treated with a non-halogenated flame retardant).

In order to achieve the above-described, the present invention has the following configuration (1).

(1) An artificial sueded leather being excellent in flame retardance, comprising: a thermoplastic synthetic fiber cloth made of a woven fabric, a knitted web, or a nonwoven fabric, having a raised-fiber or napped-fiber surface, and being impregnated with a polyurethane resin; and a flame retardant, containing at least a phosphate compound A having a solubility in water of 1% or less, a vinyl-group-containing resin C capable of forming a carbonization skeleton in burning, and a water-insoluble thickener D, the flame retardant being imparted to one face of the thermoplastic synthetic fiber cloth.

In addition, the artificial sueded leather of the present invention also includes the following more concretely preferable configurations (2) to (7).

(2) The artificial sueded leather being excellent in flame retardance according to (1) above, wherein the phosphate compound A includes at least one selected from the group consisting of ammonium polyphosphate, melamine polyphosphate, phosphoramides, and phosphazene compounds.

(3) The artificial sueded leather being excellent in flame retardance according to either (1) or (2) above, wherein the vinyl-group-containing resin C includes at least one selected from the group consisting of vinyl acetate resin emulsions, ethylene-vinyl acetate copolymer resin emulsions, acrylic vinyl acetate copolymer resin emulsions, vinyl acetate vinyl copolymer resin emulsions, and branched fatty acid vinyl acetate vinyl copolymer resin emulsions.

(4) The artificial sueded leather being excellent in flame retardance according to any of (1), (2), or (3) above, wherein the water-insoluble thickener D is an alkaline thickener-type acrylic resin or an ethylene oxide higher fatty acid ether.

(5) The artificial sueded leather being excellent in flame retardance according to (1), (2), (3), or (4) above, wherein the flame retardant includes a water-insoluble phosphate ester B.

(6) The artificial sueded leather being excellent in flame retardance according to (5) above, wherein the water-insoluble phosphate ester B includes at least one from the group consisting of condensed phosphate esters and aromatic phosphate esters.

(7) The artificial sueded leather being excellent in flame retardance according to (1), (2), (3), (4), (5), or (6) above, wherein the flame retardant furthermore includes an acrylic resin.

In addition, in order to achieve the above-described, a method of producing an artificial sueded leather of the present invention has the following configuration (8).

(8) A method of producing an artificial sueded leather being excellent in flame retardance, the artificial sueded leather being a thermoplastic synthetic fiber cloth made of a woven fabric, a knitted web, or a nonwoven fabric, having a raised-fiber or napped-fiber surface, and being impregnated with a polyurethane resin, the method comprising the step of imparting to one face of the thermoplastic synthetic fiber cloth a flame retardant, the flame retardant containing at least a phosphate compound A having a solubility in water of 1% or less, a vinyl-group-containing resin C capable of forming a carbonization skeleton in burning, and a water-insoluble thickener D.

In addition, the artificial sueded leather of the present invention also includes the following more concretely preferable configurations (9) and (10).

(9) The method of producing an artificial sueded leather being excellent in flame retardance according to (8) above, wherein a flame retardant containing a water-insoluble phosphate ester B is used as the flame retardant.

(10) The method of producing an artificial sueded leather being excellent in flame retardance according to (8) or (9) above, furthermore wherein a flame retardant containing an acrylic resin is used as the flame retardant.

According to claims 1-7 of the present invention, an artificial sueded leather being excellent in flame retardance is provided, the leather being excellent in flame retardance, light resistance, and abrasion resistance, and furthermore not exhibiting water spot nor using any halogenated chemical (i.e., being treated with a non-halogenated flame retardant).

In addition, according to claims 8 to 10 of the present invention, a method of producing an artificial sueded leather being excellent in flame retardance is provided, the leather being excellent in flame retardance, light resistance, and abrasion resistance, and furthermore not exhibiting water spot nor using any halogenated chemical (i.e., being treated with a non-halogenated flame retardant).

BEST MODE FOR CARRYING OUT THE INVENTION

Hereinafter, the artificial sueded leather and production method thereof in accordance with the present invention will be described in further detail.

The artificial sueded leather being excellent in flame retardance of the present invention comprises a thermoplastic synthetic fiber cloth made of a woven fabric, a knitted web, or a nonwoven fabric having a raised-fiber or napped-fiber surface and being impregnated with a polyurethane resin, and a flame retardant containing at least a phosphate compound A having a solubility in water of 1% or less as measured at a temperature of about 25° C., a vinyl-group-containing resin C capable of forming a carbonization skeleton in burning, and a water-insoluble thickener D, the flame retardant being imparted to one face of the thermoplastic synthetic fiber cloth.

A component part of the artificial sueded leather being excellent in flame retardance of the present invention, namely, the thermoplastic synthetic fiber cloth made of a woven fabric, a knitted web, or a nonwoven fabric having a raised-fiber or napped-fiber surface and being impregnated with a polyurethane resin, is known in the textile industry as an artificial sueded leather utilizing conventional ultra-fine thermoplastic synthetic fibers (typically, 0.0001-1.1 dtex ultra-fine fibers) and a polyurethane resin.

In the present invention, a flame retardant is imparted to one face of such a thermoplastic synthetic fiber cloth made of a woven fabric, a knitted web, or a nonwoven fabric. Typically, the flame retardant imparted to the reverse face, i.e., the face on the opposite side of the outer face of the artificial sueded leather product. The flame retardant contains at least a phosphate compound A having a solubility in water of 1% or less, a vinyl-group-containing resin C capable of forming a carbonization skeleton in burning, and a water-insoluble thickener D.

Typically, the viscosity of the flame retardant that includes the water-insoluble thickener D is preferably in the range of 1000-10000 mPa·s, and more preferably in the range of 3000-7000 mPa·s. Most typically, the viscosity may be adjusted to be approximately 5000±1000 mPa·s. Adjusting the viscosity of the flame retardant to be in this range enables the flame retardant to permeate the artificial sueded leather to an appropriate degree, and moreover prevents the flame retardant from permeating to the outer face of artificial sueded leather more than necessary and damaging the texture, feel, and surface appearance of the leather.

The flame retardant in accordance with the present invention, having thickening effects, does not have a low viscosity. For this reason, the flame retardant does not permeate to the deep inner layers of the artificial leather, and furthermore does not permeate to the opposite outer face that is the product surface. The flame retardant stops near the surface layers of the reverse face of the artificial leather product, and does not damage the feel, texture, or appearance of the delicate outer face of the artificial leather product made of ultra-fine fibers.

From such a perspective, the imparted quantity of flame retardant may be in the range of 30-150 g/m², and more preferably in the range of 40-100 g/m².

The essential flame retardant characteristics in the artificial leather of the present invention are brought about by the phosphate compound A having a solubility in water of 1% or less, and the vinyl-group-containing resin C capable of forming a carbonization skeleton in burning.

The phosphate compound A having a solubility in water of 1% or less brings about flame retardant effects due to carbonization/dehydration reactions, while the vinyl-group-containing resin C capable of forming a carbonization skeleton in burning creates the effect of stopping the continuation of burning by forming a hard char layer.

In consideration of having a solubility of 1% or less and strong carbonization/dehydration effects, it is preferable that the phosphate compound A contain at least one from the group consisting of ammonium polyphosphate, melamine polyphosphate, phosphoramides, and phosphazene compounds.

In addition, it is preferable that the vinyl-group-containing resin C contain at least one from the group consisting of vinyl acetate resin emulsions, ethylene-vinyl acetate copolymer resin emulsions, acrylic vinyl acetate copolymer resin emulsions, vinyl acetate vinyl copolymer resin emulsions, and branched fatty acid vinyl acetate vinyl copolymer resin emulsions. The formation of carbides that occurs due to the combination of a vinyl acetate or vinyl acetate copolymer resin with a phosphate compound facilitates flame retardance, and in particular exhibits an improvement of flame retardant characteristics with respect to horizontal burning of the artificial leather.

In addition, it is preferable that the water-insoluble thickener D be an alkaline thickener-type acrylic resin or an ethylene oxide higher fatty acid ether. That the thickener D is water-insoluble refers to the characteristic that once the thickener has dried, the thickener becomes no longer soluble in water. In concrete terms, this refers to the fact that for a 1 g film of the thickener, having been dried in a desiccator under drying conditions of 100° C. for 60 min., then inserted into 100 cc of water at 25° C., and left therein for one hour, not more than 1% of the thickener has been dissolved.

In the present invention, a water-soluble paste is not used as the thickener, and instead an agent that is not readily soluble in water upon drying is used, being selected from either an alkaline thickener-type acrylic resin or a polyoxyethylene higher fatty acid ester, as stated above. If a water-soluble paste is used, water spot occurs and is thus not preferable.

In addition, the flame retardant in the present invention preferably contains a water-insoluble phosphate ester B. By using phosphate compounds, which are highly insoluble in water, in the flame retardant, more favorable flame retardance without water spot can be imparted. In particular, if a water-insoluble phosphate ester is used, flame retardance without water spot can be supplementarily realized, and a suppleness can be imparted to the whole of the artificial leather product.

In addition, in the present invention, other resins such as acrylic resins, SBR resins, and MBR resins may also be used, provided they do not affect the char formation of the above-described vinyl acetate or vinyl acetate copolymer resins. In particular, if the flame retardant is made to furthermore include an acrylic resin, the advantages of softened texture and improved water resistance of the flame retardant are obtained.

As described above, by using the phosphate compound A having a solubility in water of 1% or less, flame retardance without water spot can be imparted. Furthermore, the use of water-insoluble substances is preferable for other components such as the thickener.

The sueded artificial leather being excellent in flame retardance of the present invention performs char formation as a result of the combination of a vinyl-group-containing resin and a phosphate compound. This facilitates flame retardance, and in particular brings about advantages in the horizontal burning characteristics of the artificial leather.

In particular, although water-soluble flame-proofing agents were widely used in conventional flame-proofing agents, in the present invention such water-soluble flame-proofing agents and water-soluble pastes are not used. As a result, flame retardance without water spot is imparted. In other words, while water-soluble guanidine phosphate, or halogenated substances in the case of a water-insoluble substance, were widely used as typical flame-proofing agents in the conventional art, in the present invention halogenated substances are not used.

In the present invention, compounds such as aluminum hydroxide, magnesium hydroxide, and metallic oxides may also be used as flame retardant auxiliary in addition to the above-described components in the flame retardant.

The artificial sueded leather of the present invention is obtained in the following way. Dyeing processing is performed on an artificial leather cloth made of raised ultra-fine fibers into which an elastomer such as polyurethane has been impregnated. Subsequently, a non-halogenated flame retardant, which includes the above-described phosphate compound A, vinyl-group-containing resin, and water-insoluble thickener D, is imparted to one face of the artificial leather cloth, preferably the reverse face, such that the agent does not permeate to the opposite outer face.

A woven fabric, knitted web, or nonwoven fabric made of ultra-fine synthetic fibers having a single-fiber fineness of not more than 1 decitex, and into which an elastomer such as polyurethane has been impregnated, may be used as the artificial sueded leather. The leather preferably contains synthetic fibers of 0.5 decitex or less, and more preferably contains synthetic fibers of 0.3 decitex or less.

For the ultra-fine synthetic fibers that comprise the woven fabric, knitted web, or nonwoven fabric, synthetic fibers such as polyester synthetic fibers (typified by polyethylene terephthalate, polytrimethylene terephthalate, polybutylene terephthalate, and copolymer polyester fiber having these as primary components), polyamide synthetic fibers (typified by nylon 6 and nylon 6,6), or polypropylene fibers may be used. Among these, polyethylene terephthalate fibers are preferable, having excellent dye affinity, color fastness, and abrasion resistance.

The method of producing the artificial sueded leather is not particularly limited. The methods that are already being widely conducted in the synthetic fiber industry in recent years may be used.

For example, an artificial leather cloth with a sueded, raised-fiber surface may be obtained in the following way. Composite fibers are spun via the sea-island composite spinning method, taking polystyrene as the sea component and polyester as the island component. The composite fibers are used to form a fiber web via spunbonding, melt-blow, or papermaking methods, or via a combination of carding and cross-wrapping methods. The fiber web is used to form an entangled nonwoven fabric by performing entanglement processing such as needle-punch processing or waterjet-punch processing. Subsequently, the sea component of the composite fiber is removed via solvent extraction, heat separation, or another method. For the elastomer, substances such as polyurethane elastomers, acrilonitrile, butadiene rubber, natural rubber, or polyvinyl chloride may be used. In addition, a method wherein an elastomer is applied in a coat or impregnated, then dried and adhered may be adopted as the method of imparting the elastomer. Subsequently, the outer face of the nonwoven fabric to which an elastomer has been imparted is subjected to fiber-raising using sandpaper or other abrasive.

Furthermore, when performing the dyeing processing on the artificial leather, in addition to the dyeing processing such as for example liquid flow dyeing using a jigger dyeing machine or a liquid flow dyeing machine, or dip dyeing processing such as thermosol dyeing using a continuous dyeing machine, printing processing on the raised-fiber surface using roller printing, screen printing, inkjet printing, sublimation printing, or vacuum sublimation printing may be used. Among these, it is preferable to use a liquid flow dyeing machine for quality/appearance considerations, such as the soft texture obtainable thereby. In addition, resin finishing processing may be performed after dyeing as necessary.

In the present invention, a flame retardant is imparted to the face on the reverse side of the sueded raised-fiber face. This imparting method is not particularly limited, and a desired quantity of flame retardant may be imparted using apparatus such as a rotary screen, a knife over roll coater, a gravure roll coater, a kiss roll coater, or a calender coater, for example.

The artificial sueded leather being excellent in flame retardance obtained in the present invention has applications not only in apparel, but also in industrial materials and automobile seats and automobile upholstery.

Moreover, the artificial leather being excellent in flame retardance in accordance with the present invention satisfies in all characteristics the necessary physical properties with regards to flame retardance processing, which obviously includes the realization of flame retardance, and also includes: the prevention of the occurrence of the above-described water spot, the realization of favorable texture, the fact that the color fastness to light thereof is not lowered, the fact that the color fastness to rubbing is not lowered, the fact that fogging does not occur, the passing of jungle tests (long-term accelerated deterioration tests), the fact that blocking does not occur, the fact that the appearance is not damaged, excellent flame lamination properties, and the fact that no problems in workability or safety exist.

EXAMPLES

Various evaluations of physical properties were conducted as follows in the description below.

(1) Flammability Test

Horizontal burning speed was measured via the FMVSS No. 302 (JIS D 1201:1998) burning test method for the interior upholstery materials of automobiles and agricultural/forestry tractors and mechanical apparatus. An MVSS burning test device (MVSS-2, Suga Test Instruments Co., Ltd.) was used.

(2) Water Spot Test Method

An artificial leather sample was placed upon urethane foam and 5 cc of water was placed upon the surface of the leather. The leather was then left as-is to dry in air, and it was subsequently observed whether round spots, etc., developed on the leather surface.

(3) Color Fastness to Light Test

The light exposure test followed JASO M 346-93 (Light-exposure test method by xenon arc lamp for automotive interior part), and the instrument used was an SC-700FT, manufactured by Suga Test Instruments Co., Ltd. The sample was tested without a backing of urethane or other material on the reverse face. Evaluation was determined on a discoloration grayscale, and grade 3 or more was considered to pass.

(4) Fogging Test

Using a windshield fogging tester (WSF-2, Suga Test Instruments Co., Ltd.), a sample was placed into the lower portion of a container and heated to 80° C. for 20 hours. A round integral measurement device (direct-reading haze computer HGM-2K, Suga Test Instruments Co., Ltd.) was then used to measure and express light transmittance, taking as the fogging factor the degree to which sublimates from the sample clouded the glass plate at the upper portion of the container. In the evaluation result the sample with a deterioration of the glass haze (transmittance) of 10% or less was considered to pass.

Example 1

Upon the reverse face of an artificial sueded leather polyester cloth of weight 360 g/m², the flame retardant shown in Table 1 is applied by the rotary screen method and subsequently dried for 15 min. at a temperature of 110° C., thus obtaining an artificial sueded leather.

The adhered quantity of the flame retardant (solid portion) was calculated via the change in weight before/after processing. Obtained evaluation results are shown in Table 1.

Flame retardance, water spot test results, light exposure test results, and fogging test results were excellent.

Example 2

As shown in Table 1, processing and evaluation were conducted for a formulation wherein the aromatic phosphate ester used in Example 1 was not used with the exception of melamine polyphosphate and aluminum hydroxide as an auxiliary flame retardant. The results are shown in Table 1.

Flame retardance, color fastness to light, fogging properties, and water spot properties were excellent; however, the texture was slightly hard.

Example 3

As shown in Table 1, processing and evaluation were conducted similarly as in Example 1 for a formulation wherein an ethylene acetate vinyl resin and an acrylic resin are used in combination.

The obtained results are shown in Table 1. Flame retardance, water spot test results, fogging test results, light exposure test results, and texture were all excellent.

Comparative Example 1

Processing was conducted similarly as in Example 1, using a composition including an aromatic phosphate ester, an acrylic resin, and antimony trioxide.

The obtained evaluation results for the artificial sueded leather are shown in Table 1; however, the flame retardance results were not satisfactory.

Comparative Example 2

As shown in Table 1, processing was conducted similarly as in Example 1, using a flame retardant with a formulation otherwise identical to that of Example 1 but wherein a water-soluble paste was also used as a thickener.

The obtained evaluation results are shown in Table 1. Flame retardance, color fastness to light, and fogging were somewhat satisfactory, but results were poor in the water spot test.

TABLE 1

| Flame retardant composition | Example 1 | Example 2 | Example 3 | Comparative Example 1 | Comparative Example 2 |
|---|---|---|---|---|---|
| Ammonium polyphosphate | 18 parts | 15 parts | 18 parts | 0 parts | 18 parts |
| Melamine polyphosphate | 0 | 5 | 0 | 0 | 0 |
| Aromatic phosphate ester | 5 | 0 | 5 | 23 | 5 |
| Ethylene vinyl acetate resin | 14 | 14 | 10 | 0 | 14 |
| Alkaline thickener acrylic resin | 0.5 | 0.5 | 0.5 | 0.5 | 0 |
| Acrylic resin | 0 | 0 | 5 | 12 | 0 |
| Aluminum hydroxide | 0 | 12 | 0 | 0 | 12 |
| Antimony trioxide | 0 | 0 | 0 | 23 | 0 |
| CMC paste (thickener) | 0 | 0 | 0 | 0.8 | 1.7 |
| PVA paste (thickener) | 0 | 0 | 0 | 0 | 0.4 |
| Ammonia water | 0.1 | 0.1 | 0.1 | 0 | 0 |
| Water | 62.5 | 53.5 | 61.5 | 41.2 | 48.9 |
| Coat quantity (dry portion) (g/m²) | 68 | 71 | 65 | 82 | 72 |
| Flame retardance (mm/min) | 0 | 0 | 0 | 115 | 0 |
| Color fastness to light (grade) | 4 | 4 | 4 | 4 | 4 |
| Fogging test | Good | Good | Good | Satisfactory | Good |
| Water damage test | None | None | None | Some | Much |

What is claimed is:

1. An artificial sueded leather being excellent in flame retardance, comprising:
    a thermoplastic synthetic fiber cloth made of a woven fabric, a knitted web, or a nonwoven fabric, having a raised-fiber or napped-fiber surface, and being impregnated with a polyurethane resin; and
    a flame retardant, containing at least (i) a phosphate compound A including at least one selected from the group consisting of ammonium polyphosphate, melamine polyphosphate, phosphoramides, and phosphazene compounds, and having a solubility in water of 1% or less as measured at a temperature of about 25° C., (ii) a water-insoluble phosphate ester B, (iii) a vinyl-group-containing resin C that forms a carbonization skeleton when burned, (iv) a water-insoluble thickener D which is an ethylene oxide higher fatty acid ether, and (v) an acrylic resin, the flame retardant having a weight ratio of the phosphate compound A to the vinyl-group-containing resin C of A:C=1.07 to 1.8:1;

wherein the flame retardant is coated only to a reverse side face or a portion thereof of the surface of the raised-fiber or napped-fiber, the phosphate compound A, the vinyl-group-containing resin C and the water-insoluble thickener D are fixed to surfaces of thermoplastic synthetic fibers and the polyurethane resin that form the leather, the water-insoluble phosphate ester B includes at least one selected from the group consisting of condensed phosphate esters and aromatic phosphate esters, and the vinyl-group-containing resin C includes at least one selected from the group consisting of: vinyl acetate resin emulsions, ethylene-vinyl acetate copolymer resin emulsions, acrylic vinyl acetate copolymer resin emulsions, vinyl acetate vinyl copolymer resin emulsions, and branched fatty acid vinyl acetate vinyl copolymer resin emulsions.

2. An artificial sueded leather being excellent in flame retardance, comprising:

a thermoplastic synthetic fiber cloth made of a woven fabric, a knitted web, or a nonwoven fabric, having a raised-fiber or napped-fiber surface, and being impregnated with a polyurethane resin; and a flame retardant, containing at least (i) a phosphate compound A including at least one selected from the group consisting of ammonium polyphosphate, melamine polyphosphate, phosphoramides, and phosphazene compounds, and having a solubility in water of 1% or less as measured at a temperature of about 25° C., (ii) a water-insoluble phosphate ester B, (iii) a vinyl-group-containing resin C that forms a carbonization skeleton when burned, (iv) a water-insoluble thickener D which is an ethylene oxide higher fatty acid ether, and (v) an acrylic resin, the flame retardant having a weight ratio of the phosphate compound A to the vinyl-group-containing resin C of A:C=1.07 to 1.8:1;

wherein the polyurethane resin does not contain phosphate compound A, the flame retardant is coated only to a reverse side face or a portion thereof of the surface of the raised-fiber or napped-fiber, the phosphate compound A, the vinyl-group-containing resin C and the water-insoluble thickener D are fixed to surfaces of thermoplastic synthetic fibers and the polyurethane resin that form the leather, the water-insoluble phosphate ester B includes at least one selected from the group consisting of condensed phosphate esters and aromatic phosphate esters, and the vinyl-group-containing resin C includes at least one selected from the group consisting of: vinyl acetate resin emulsions, ethylene-vinyl acetate copolymer resin emulsions, acrylic vinyl acetate copolymer resin emulsions, vinyl acetate vinyl copolymer resin emulsions, and branched fatty acid vinyl acetate vinyl copolymer resin emulsions.

\* \* \* \* \*